US011822970B2

(12) United States Patent
Gujar et al.

(10) Patent No.: US 11,822,970 B2
(45) Date of Patent: Nov. 21, 2023

(54) IDENTIFIER (ID) ALLOCATION IN A VIRTUALIZED COMPUTING ENVIRONMENT

(71) Applicant: NICIRA, INC., Palo Alto, CA (US)

(72) Inventors: Bhagyashree Gujar, Pune (IN);
Prashant Ambardekar, Pune (IN);
Prayas Gaurav, Pune (IN); James Joseph Stabile, Palo Alto, CA (US)

(73) Assignee: NICIRA, INC., Palo Alto, CA (US)

( * ) Notice: Subject to any disclaimer, the term of this patent is extended or adjusted under 35 U.S.C. 154(b) by 350 days.

(21) Appl. No.: 15/297,172

(22) Filed: Oct. 19, 2016

(65) Prior Publication Data

US 2017/0371716 A1 Dec. 28, 2017

(30) Foreign Application Priority Data

Jun. 24, 2016 (IN) .............................. 201641021782

(51) Int. Cl.
*G06F 9/50* (2006.01)
*G06F 9/455* (2018.01)

(52) U.S. Cl.
CPC ........ *G06F 9/5077* (2013.01); *G06F 9/45558* (2013.01); *G06F 2009/4557* (2013.01); *G06F 2009/45595* (2013.01)

(58) Field of Classification Search
CPC . G06F 9/52–528; G06F 9/45558–5077; H04L 61/20–2092
See application file for complete search history.

(56) References Cited

U.S. PATENT DOCUMENTS

| 5,884,322 A * | 3/1999 | Sidhu .................. H04L 61/5038 |
| | | 709/200 |
| 6,457,053 B1 * | 9/2002 | Satagopan .............. H04L 69/40 |
| | | 709/244 |
| 6,842,789 B1 * | 1/2005 | Nazari ................ H04L 61/5061 |
| | | 710/9 |

(Continued)

FOREIGN PATENT DOCUMENTS

WO WO-2011049553 A1 * 4/2011 ............. H04L 67/16

OTHER PUBLICATIONS

Data Structure Consistency Using Atomic Operations in Storage Devices Ananth Devulapalli, Dennis Dalessandro, Pete Wyckoff (Year: 2008).*

*Primary Examiner* — Emerson C Puente
*Assistant Examiner* — Paul V Mills
(74) *Attorney, Agent, or Firm* — SU IP CONSULTING (57) ABSTRACT

Example methods are provided for a first node to perform identifier (ID) allocation in a virtualized computing environment that includes a cluster formed by the first node and at least one second node. The method may comprise retrieving, from a pool of IDs associated with the cluster, a batch of IDs to a cache associated with the first node. The pool of IDs may be shared within the cluster and the batch of IDs retrieved for subsequent ID allocation by the first node. The method may also comprise, in response to receiving a request for ID allocation from an ID consumer, allocating one or more IDs from the batch of IDs in the cache to respective one or more objects for unique identification of the one or more objects across the cluster; and sending, to the ID consumer, a response that includes the allocated one or more IDs.

19 Claims, 5 Drawing Sheets

(56) References Cited

U.S. PATENT DOCUMENTS

| | | | |
|---|---|---|---|
| 7,197,549 B1* | 3/2007 | Salama | H04L 29/12283 |
| | | | 709/223 |
| 8,856,540 B1* | 10/2014 | Kirubanandan | G06F 21/30 |
| | | | 713/182 |
| 9,813,374 B1* | 11/2017 | Magerramov | H04L 61/2061 |
| 2007/0276833 A1* | 11/2007 | Sen | G06F 17/30312 |
| 2009/0213763 A1* | 8/2009 | Dunsmore | H04L 12/42 |
| | | | 370/258 |
| 2010/0189073 A1* | 7/2010 | Gandham | H04L 29/12283 |
| | | | 370/331 |
| 2011/0238793 A1* | 9/2011 | Bedare | H04L 45/586 |
| | | | 709/220 |
| 2014/0351396 A1* | 11/2014 | Stabile | H04L 67/1095 |
| | | | 709/223 |
| 2016/0234161 A1* | 8/2016 | Banerjee | H04L 67/10 |

* cited by examiner

IDENTIFIER (ID) ALLOCATION IN A VIRTUALIZED COMPUTING ENVIRONMENT

RELATED APPLICATIONS

Benefit is claimed under 35 U.S.C. 119(a)-(d) to Foreign application Serial No. 201641021782 filed in India entitled "IDENTIFIER (ID) ALLOCATION IN A VIRTUALIZED COMPUTING ENVIRONMENT", on Jun. 24, 2016, by NICIRA, INC., which is herein incorporated in its entirety by reference for all purposes.

BACKGROUND

Unless otherwise indicated herein, the approaches described in this section are not admitted to be prior art by inclusion in this section.

Virtualization allows the abstraction and pooling of hardware resources to support virtual machines in a virtualized computing environment, such as a Software-Defined Datacenter (SDDC). For example, through server virtualization, virtual machines running different operating systems may be supported by the same physical machine (e.g., referred to as a "host"). Each virtual machine is generally provisioned with virtual resources to run an operating system and applications. The virtual resources may include central processing unit (CPU) resources, memory resources storage resources, network resources, etc. In practice, hosts in the virtualized computing environment may be managed by a cluster of nodes, such as management components on a management plane, etc. Such nodes are configured to facilitate the configuration of objects in the virtualized computing environment, including allocating identifiers (IDs) to those objects. However, in practice, ID allocation may not be performed efficiently.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

The challenges of implementing identifier (ID) allocation will now be explained in more detail using FIG. 1, which is a schematic diagram illustrating example virtualized computing environment 100 in which ID allocation may be performed. It should be understood that, depending on the desired implementation, virtualized computing environment 100 may include additional and/or alternative components than that shown in FIG. 1.

Virtualized computing environment 100 includes multiple nodes forming cluster 102, such as node-A 110A, node-B 110B and node-C 110C that are connected via physical network 104. In practice, each node 110A/110B/110C may be implemented using a virtual entity (e.g., virtual appliance, virtual machine, etc.) and/or a physical entity. Each node 110A/110B/110C is supported by hardware 112A/112B/112C that includes components such as processor(s) 114A/114B/114C, memory 116A/116B/116C, network interface controller(s) 118A/118B/118C, storage disk(s) 119A/119B/119C, etc.

In one example, cluster 102 represents a distributed cluster having node-A 110A, node-B 110B and node-C 110C operating as management components on a management plane of a network virtualization platform, such as VMware's NSX (a trademark of VMware, Inc.), etc. The network virtualization platform is implemented to virtualize network resources such as physical hardware switches to support software-based virtual networks. In this case, each node 110A/110B/110C may represent a network virtualization manager (e.g., NSX manager) via which the software-based virtual networks are configured by users. Through network virtualization, benefits similar to server virtualization may be derived for networking services. For example, virtual networks may be provisioned, changed, stored, deleted and restored programmatically without having to reconfigure the underlying physical hardware or topology. In a multi-site environment, node-A 110A, node-B 110B and node-C 110C may be associated with different sites each site representing a geographical location, business unit, organization, etc.

Each node 110A/110B/110C implements ID allocation module 120A/120B/120C to provide an ID allocation service (IDAS) and/or ID generation service (IDGS) to any suitable ID consumer, such as first ID consumer 126A/126B/126C, second ID consumer 128A/128B/128C, etc. Persistent storage 170 is configured to store pool of IDs 172 that is shared across cluster 102. For example, to meet ID allocation requests from ID consumer 126A/128A, ID allocation module 120A of node-A 110A may retrieve ID(s) from pool of IDs 172.

As used herein, the term "ID consumer" may refer generally to any component that requests for IDs from ID allocation module 120A/120B/120C. In practice, an ID consumer may reside on the same physical machine as node 110A/110B/110C (as shown in FIG. 1) or on a different physical machine depending on the desired implementation. An ID consumer may be a physical entity, or a virtual entity supported by the physical entity. The term "persistent storage" 170 may refer generally to storage device in which information stored therein is not lost when the storage device fails or is powered down.

ID allocation is performed for unique identification of objects across cluster 102, such as firewall rules in virtualized computing environment 100. In more detail, FIG. 2 is a schematic diagram illustrating an example distributed firewall implementation 200 in virtualized computing environment 100 in FIG. 1. For simplicity, node-B 110B and node-C 110C from cluster 102 are not shown in FIG. 2, but it should be understood that they may be similarly configured to implement distributed firewall.

In the example in FIG. 2, node-A 110A implements ID consumer 126A in the form of a distributed firewall controller. A user (e.g., network administrator) may interact with the distributed firewall controller to configure firewall rules 262 for hosts 210 (one host is shown in detail for simplicity). Host 210 includes suitable virtualization software (e.g., hypervisor 211) and hardware 212 to support various virtual machines, such as "VM1" 221 and "VM2" 222. Hypervisor 211 maintains a mapping between underlying hardware 212 of host 210 and virtual resources allocated to virtual machine 221/222. Hardware 212 includes physical components (some not shown for simplicity) such as Central Processing Unit (CPU), memory, storage disk(s), and physical network interface controllers (NICs) 214, etc.

The virtual resources are allocated to virtual machine 221/222 to support application(s) running on top of guest operating system executing at virtual machine 221/222, For example, corresponding to hardware 212, the virtual resources may include virtual CPU, virtual memory, virtual disk, virtual network interface controller (vNIC), etc. Virtual machine monitors (VMMs) 231, 232 implemented by hypervisor 211 are to emulate hardware resources, such as "VNIC1" 241 for "VM1" 221 and "VNIC2" 242 for "VM2" 222. Hypervisor 211 further supports virtual switch 250 to handle packets to and from virtual machine 221/222.

To protect host 210 against security threats caused by unwanted packets, a firewall is implemented to filter packets to and from the virtual machines. In a distributed firewall architecture, each host 210 implements local firewall engine 260 to filter packets for "VM1" 221 or "VM2" 222 according to firewall rules 262. This way, hosts 210 may implement firewall in a distributed manner. For example, based on firewall rules 262, firewall engine 260 may allow some packets to be delivered to "VM1" 221 (see "PASS" 270), while dropping other packets that are destined for "VM2" 222 (see "DROP" 280). Firewall rules 262 may be configured via distributed firewall controller (see 126A), which interacts with host 210 to apply or update firewall rules 262.

One requirement for firewall rule configuration is the assignment of unique IDs for identifying firewall rules 262 across cluster 102, such as 30-bit monotonically increasing IDs. For example, when a virtual machine (e.g., "VM1" 221) is migrated from a source site associated with node-A 110A to a target site associated with node-B 110B, the same IDs may be used without having to reconfigure firewall rules 262. This increases the mobility of virtual machines within cluster 102 and facilitates disaster recovery in virtualized computing environment 100.

Conventionally, ID allocation generally involves node 110A/110B/110C retrieving IDs from shared pool 172 responsive to each and every ID allocation request from ID consumer 126A/128A. In a database environment, this may involve sending a query to, and receiving a result from, persistent storage 170. Each query results in a network round trip. In the example distributed firewall in FIG. 2 and other application that require high-volume and frequent ID allocations, the delay resulting from the network round trips of the queries may be detrimental to the performance of node 110A/110B/110C.

ID Allocation Using Cache

According to examples of the present disclosure, ID allocation may be performed more efficiently by reducing or minimizing access to persistent storage 170. In particular, instead of accessing persistent storage 170 in response to each and every ID allocation request, a pre-allocation approach is used by retrieving a batch of IDs from shared pool 172 to service future ID allocation requests. By reducing or minimizing access to persistent storage 170, the latency associated with ID allocation request processing may be reduced, and the performance of node 110A/110B/110C improved.

Figure 1:
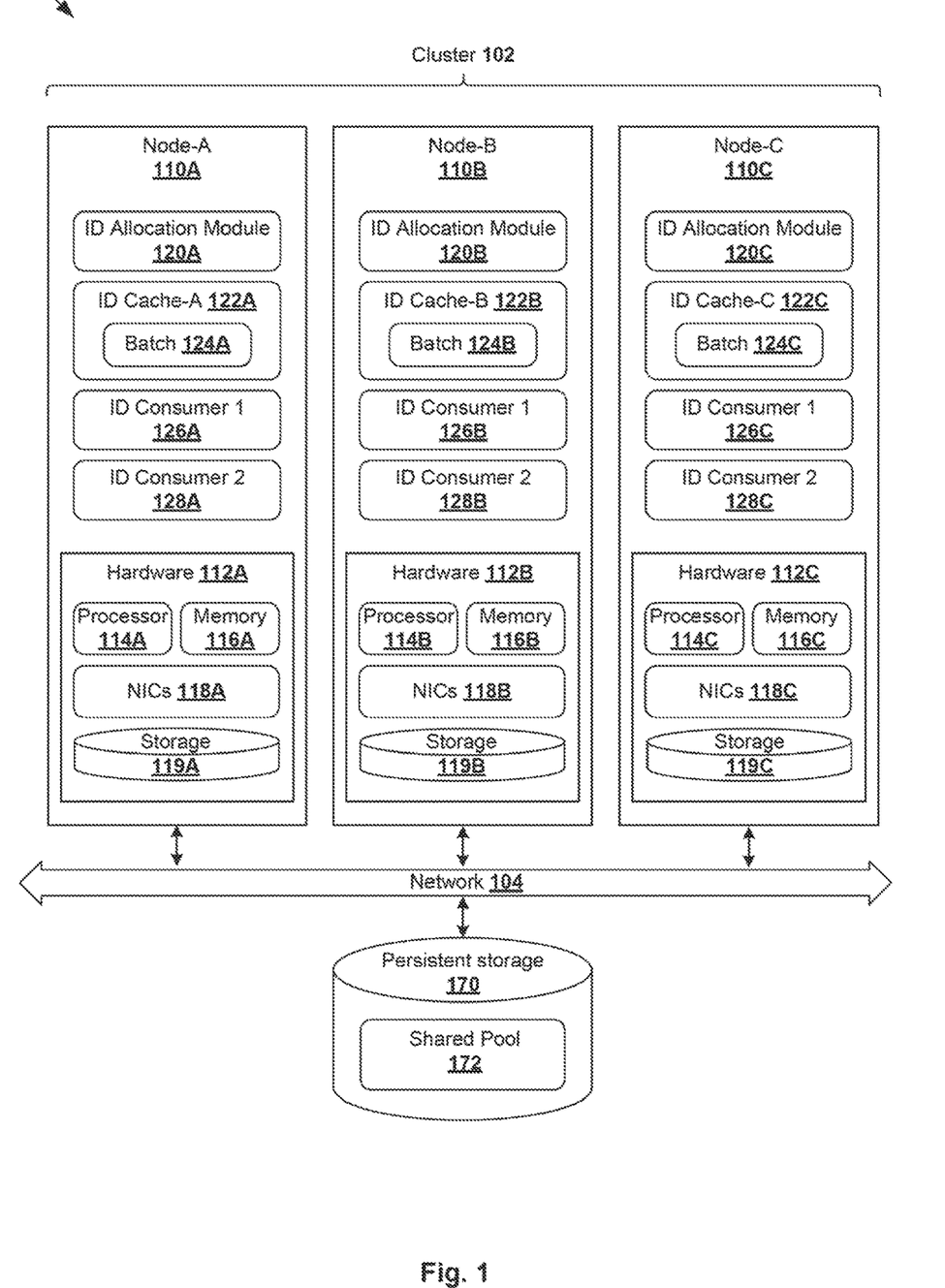
FIG. 1 is a schematic diagram illustrating an example virtualized computing environment in which identifier (ID) allocation may be performed.
Figure 2:
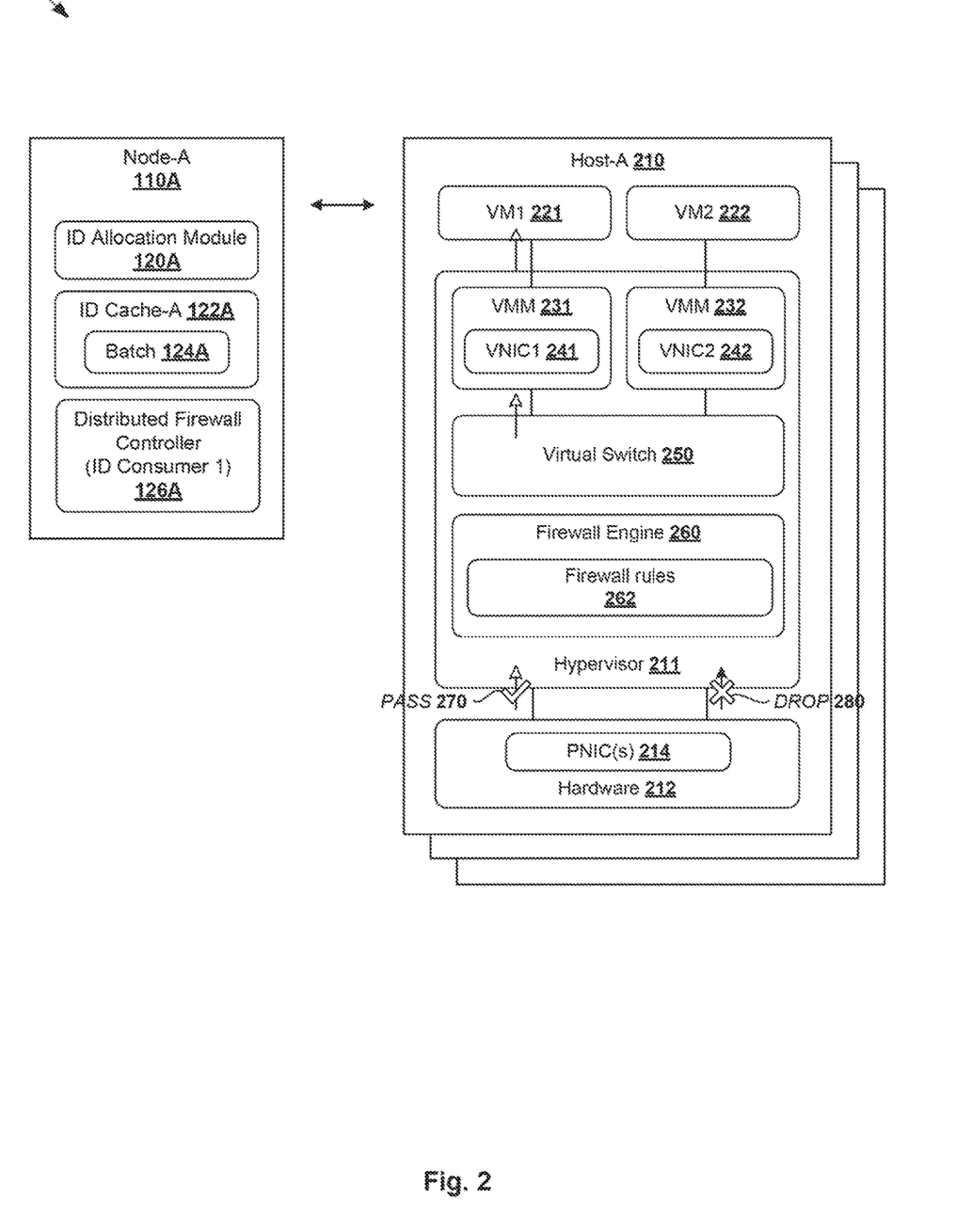
FIG. 2 is a schematic diagram illustrating an example distributed firewall implementation in the virtualized computing environment in FIG. 1.

For example in FIG. 1, first batch 124A is retrieved from pool 172 to cache-A 122A at node-A 110A; second batch 124B to cache-B 122B at node-B 110B; and third batch 124C to cache-C 122C at node-C 110C. This way, each node 110A/110B/110C may perform ID allocation in a distributed and concurrent manner using the retrieved IDs in its own cache 122A/122B/122C. As used herein, the term "cache" may refer generally to memory (or an area of memory) storing IDs locally (i.e., "local" to particular node 110A/110B/110C) to improve the speed of allocation of such IDs and reduce the number of accesses made to persistent storage 170. For example, each batch of IDs 124A/124B/124C may be stored temporarily in cache 122A/122B/122C (e.g., in-memory cache) for future access by ID allocation module 120A/120B/120C.

Figure 3:
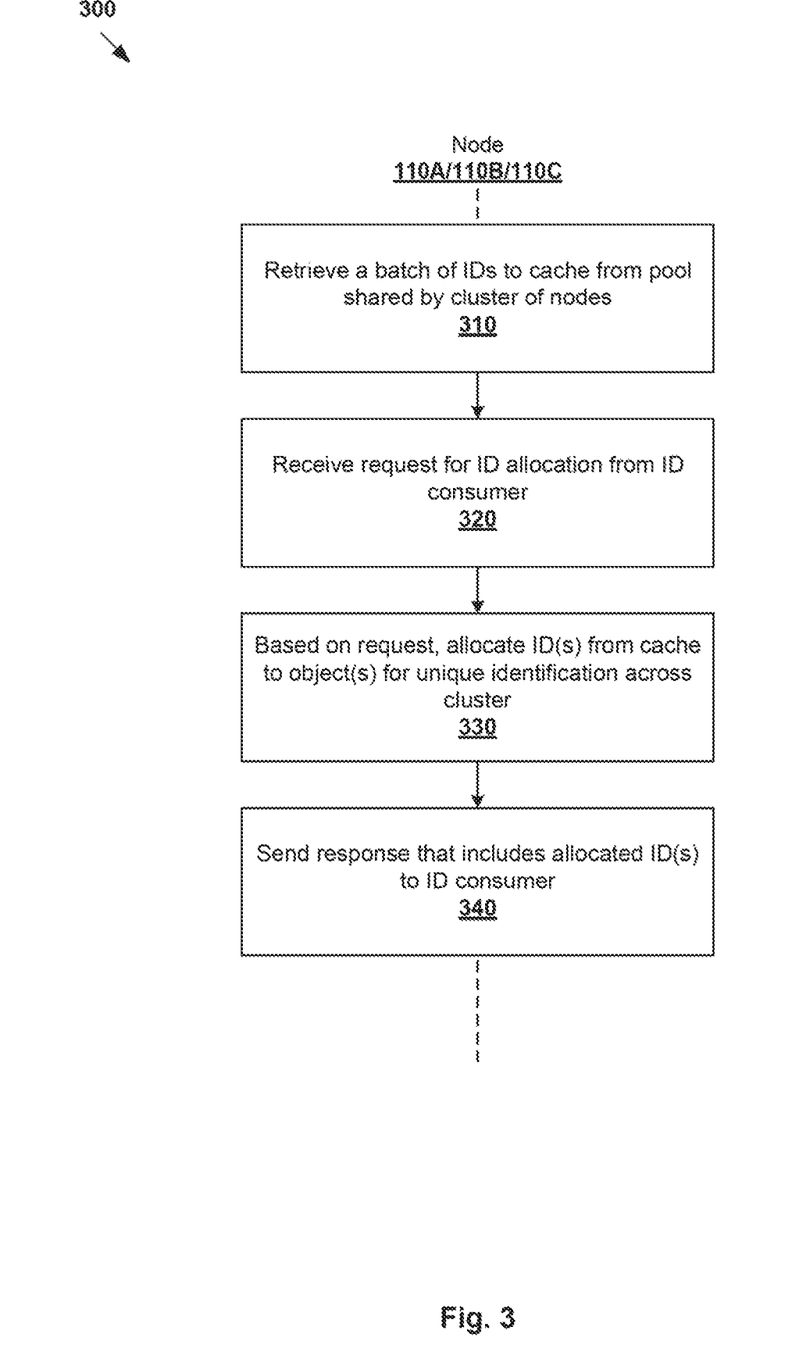
FIG. 3 is a flowchart of an example process for a node to perform ID allocation in a virtualized computing environment.

In more detail, FIG. 3 is a flowchart of example process 300 for node 110A/110B/110C to perform ID allocation in virtualized computing environment 100. Example process 300 may include one or more operations, functions, or actions illustrated by one or more blocks, such as 310 to 340. The various blocks may be combined into fewer blocks, divided into additional blocks, and/or eliminated depending on the desired implementation. Example process 300 may be performed by node 110A/110B/110C, such as using ID allocation module 120A/120B/120C, etc. For simplicity, an example will be described using node-A 110A ("first node") in the following. It should be understood that example process 300 may be similarly performed by node-B 110B and node-C 110C ("second node").

At 310 in FIG. 3, node-A 110A retrieves batch of IDs 124A from shared pool 172 to cache-A 122A. For example in FIG. 2, the IDs may be retrieved to service future ID allocation requests from a distributed firewall controller (i.e., ID consumer). In this case, the IDs may be used for uniquely identifying firewall rules 262 across cluster 102. To facilitate unique ID allocation, there is no overlap among batch 124A at node-A 110A, batch 124B at node-B 110B and batch 124C at node-C 110C. This way, IDs in batch 124A may be exclusively allocated by node-A 110A in a cluster-aware manner, and the same ID is not allocated to different objects by different nodes.

At 320 and 330 in FIG. 3, in response to receiving a request for ID allocation from ID consumer 126A/128B, node-A 110A allocates ID(s) from batch 124A in cache-A 122A to object(s) for unique identification of those object(s) across cluster 102. At 340 in FIG. 3, a response that includes the allocated ID(s) is sent to ID consumer 126A/128B.

ID allocation according to example process 300 may be implemented for identifying any suitable objects across cluster 102. Besides firewall rules 262 in FIG. 2, other example objects that require unique identification may include Network Address Translation (NAT) rules, logical switches, logical (distributed) routers, etc. Example ID consumers include management components associated with the objects, such as the distributed firewall controller in FIG.

2, edge device, network gateway, logical switch manager, logical router manager, etc. In practice, multiple pools may be shared across cluster 102, such as pool 172 for firewall rules 262 and a separate pool for NAT rules. In this case, node 110A/110B/110C may maintain multiple caches to store different batches of IDs retrieved from the respective pools.

Example ID Allocations

Figure 4:
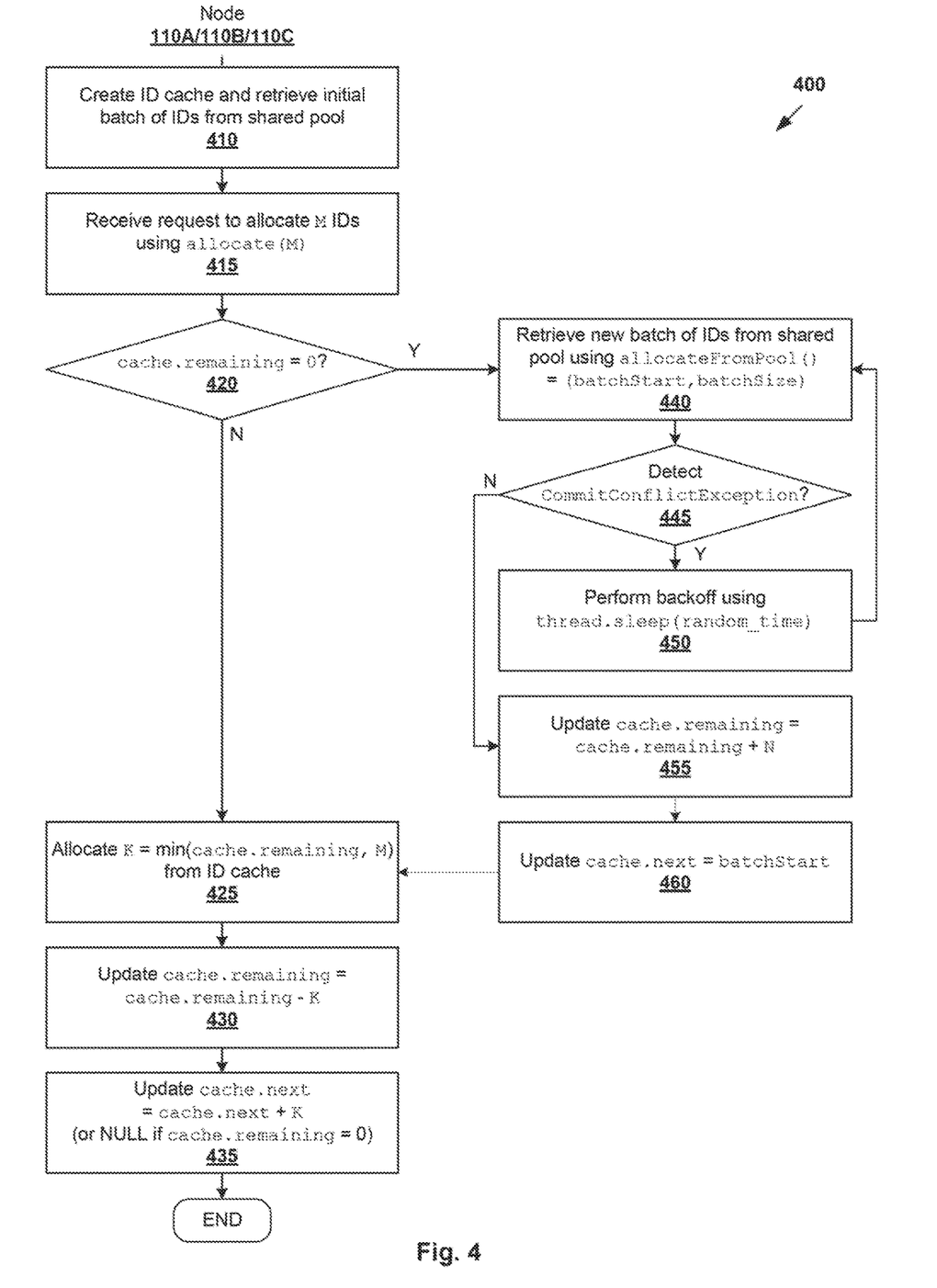
FIG. 4 is a flowchart of an example detailed process for anode to perform ID allocation in a virtualized computing environment.

In the following, various example ID allocations will be discussed using FIG. 4 and FIG. 5. FIG. 4 is a flowchart of example detailed process 400 for node 110A/110B/110C to perform ID allocation in virtualized computing environment 100. Example process 400 may include one or more operations, functions, or actions illustrated by one or more blocks, such as 410 to 460. The various blocks may be combined into fewer blocks, divided into additional blocks, and/or eliminated depending on the desired implementation.

Example process 400 may be performed by node 110A/110B/110C using any suitable approach, such as ID allocation module 120A/120B/120C, etc. The example in FIG. 4 will be explained with reference to FIG. 5, which is a schematic diagram illustrating example ID retrievals 500 from pool 172 to cache 122A/122B/122C associated with node 110A/110B/110C in virtualized computing environment 100 in FIG. 1.

At 410 in FIG. 4, cache 122A/122B/122C is created for node 110A/110B/110C with an initial batch of IDs. In the example in FIG. 5, shared pool 172 represents a common pool of IDs shared by node-A 110A, node-B 110B and node-C 110C in cluster 102. In practice, shared pool 172 and cache 122A/122B/122C may be implemented as objects or data structures having any suitable attributes. For example, shared pool 172 may be characterized by pool.start (e.g., value=1; see 502) that represents a first value of shared pool 172; pool.end (e.g., value=$2^{30}$; see 504) that represents a last value of shared pool 172; and pool.lastAllocated (see 506) that indicates a value of the last allocated ID. Attribute pool.lastAllocated is updated every time a batch is successfully retrieved from shared pool 172.

Cache 122A/122B/122C may also be characterized using attributes such as cache.remaining to indicate the number or quantity of unallocated ID and cache.next to indicate the next unallocated ID in cache 122A/122B/122C. In the case of node-A 110A, a first batch of IDs (see 510) may be retrieved from shared pool 172 to cache-A 122A using any suitable approach, such as node-A 110A invoking function allocateFromPool( ) that returns a result in the form of (batchStart, batchSize). In particular, batchStart represents the first value of the retrieved batch of IDs and batchSize=N represents the size of the batch. In this case, cache-A 122A may be updated with cache.remaining=batchSize=N and cache.next=batchStart=1.

Similarly, a second batch of IDs (see 520) may be retrieved from shared pool 172 to cache-B 122B created for node-B 110B by invoking allocateFromPool( ). Using the same batchSize=N, cache-B 122B may be updated with cache.remaining=N and cache.next=N+1. For node-C 110C, a third batch of IDs (see 530) may be retrieved from shared pool 172, in which case cache-C 122C is updated with cache.remaining=N and cache.next=2N+1. Using N=1024 as an example, IDs ranging from 1 to 1024 are stored in cache-A 122A; 1025 to 2048 in cache-B 122B; and 2049 to 4072 in cache-C 122C. Although the same batchSize=N is illustrated in FIG. 5, it should be understood that different sizes may be used for different nodes according to their rate of ID consumption or any other factor(s).

Each time a batch of IDs is retrieved using the allocateFromPool( ) function, attribute pool.lastAllocated associated with shared pool 172 is updated and persisted in persistent storage 170 to keep track of the last allocated ID. For example in FIG. 5, pool.lastAllocated=N is updated by node-A 110A to indicate the last value in the first batch ranging from 1 to N (see 510). Next, pool.lastAllocated=2N is updated by node-B 110B to indicate the last value in the second batch ranging from N+1 to 2N (see 520). Similarly, pool.lastAllocated=3N is updated by node-C 110C to indicate the last value in the third batch ranging from 2N+1 to 3N (see 530). This ensures that a particular batch is exclusively retrieved by one node for subsequent ID allocation.

Following the cache creation and pre-allocation at 410, each node 110A/110B/110C may perform ID allocation from its own local cache 122A/122B/122C in a distributed manner. Using node-A 110A as an example, at 415 in FIG. 4, node-A 110A receives an ID allocation request from ID consumer 126A to allocate M IDs, with M representing a requested quantity of IDs to be allocated. At 420 in FIG. 4, node-A 110A determines whether batch 124A has been exhausted, as indicated by whether cache-A 122A is empty (i.e., cache.remaining=0). If not empty, node-A 110A proceeds with the ID allocation according to 425 to 435 in FIG. 4. Otherwise (i.e., empty), node-A 110A proceeds to retrieve a new batch of IDs from shared pool 172 according to 440 to 460 in FIG. 4. The two scenarios will be discussed further below.

(a) Cache is not Empty

Figure 5:
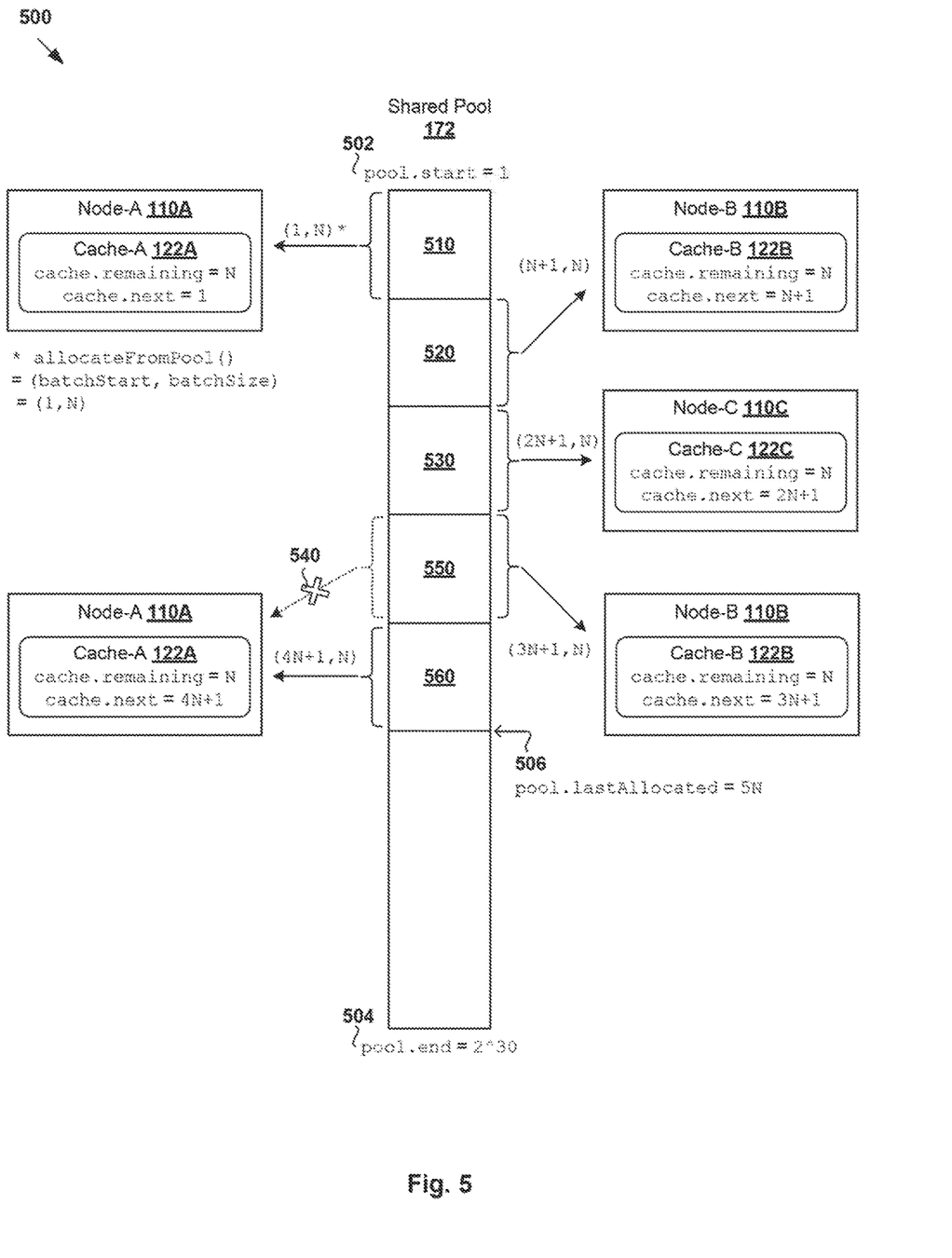
FIG. 5 is a schematic diagram illustrating example ID retrievals from a pool to a cache associated with a node in the virtualized computing environment in FIG. 1.

Using the example in FIG. 5, the request from ID consumer 126A is to allocate M=100 from N=1024 IDs in cache-A 122A. In this case, according to 425 in FIG. 4, node-A 110A allocates IDs ranging from cache.next=1 to K=min(cache.remaining=1024, M=100)=100 to ID consumer 126A. Next, according to 430 and 435 in FIG. 4, cache-A 122A is updated with cache.remaining=cache.remaining−K=1024−100=924; and cache.next=cache.next+K=1+100=101. The minimum function at 425 in FIG. 4 ensures that node-A 110A does not allocate more than the number or quantity of ID(s) available in cache-A 122A. Instead, when the request is for M=1100 and cache.remaining=1024, node-A 110A only allocates K=min(1024, 1100)=1024 IDs to ID consumer 126A. In this case, cache-A 122A is updated with cache.remaining=0 and cache.next=NULL.

Using example process 400 in FIG. 4, in the case of M>cache.remaining, node-A 110A does not immediately retrieve the required (M−cache.remaining) from shared pool 172 to meet the allocation request. Although the allocated quantity (i.e., K=1024) is less than the requested quantity (i.e., M=1100), this approach responds to ID consumer 126A with the K available IDs without having to wait for node-A 110A to retrieve more IDs. This allows ID consumer 126A to start using the available IDs, as well as reduces the response time of node-A 110A. This also reduces the number of times shared pool 172 is accessed, which in turn reduces the likelihood of conflicting with another concurrent access to shared pool 172. In practice, however, any suitable modification may be made to example process 400, such as by retrieving more IDs from shared pool 172 when cache.remaining is insufficient to meet a request.

Similarly, node-B 110B may respond to requests from ID consumer 126B/128B by allocating IDs from cache-B 122B, and node-C 110C performing allocation from cache-C 122C. Since cache-A 122A, cache-B 122B and cache-C 122C each contain a range of IDs from shared pool 172, node-A 110A, node-B 110B and node-C 110C may perform ID allocation independently in a more efficient way compared to having to access shared pool 172 in response to each and every ID allocation request.

(b) Cache is Empty

At 420 and 440 in FIG. 4, in response to receiving a subsequent ID allocation request, say for M=50 IDs, node-A 110A may determine that cache-A 122A is empty (i.e., cache.remaining=0) and proceed to retrieve a new batch of IDs from shared pool 172. Again, node-A 110A may invoke an allocateFromPool( ) function, which returns the result of (batchStart,batchSize) in the event that the retrieval is successful.

At 445 in FIG. 4, node-A 110A determines whether the retrieval from shared pool 172 is successful, such as by detecting an exception when attempting to update pool.lastAllocated associated with shared pool 172. The exception (e.g., called "CommitConflictException," "StaleObjectState" or "ConcurrentUpdate") indicates that the retrieval is unsuccessful. This occurs when shared pool 172 is concurrently accessed by multiple threads that are all attempting to update pool.lastAllocated. However, only one thread will succeed while others fail. As such, the retrieval is successful if the pool.lastAllocated attribute is successfully updated. Otherwise, the retrieval is unsuccessful if the exception is detected.

In practice, the exception may be caused by multiple threads executing on the same node (e.g., node-A 110A), or multiple threads executing on different nodes (e.g., node-A 110A and node-B 110B). Here, the term "thread" may refer generally to a thread of execution. Threads provide a way for a software program to split itself into multiple simultaneous running tasks. For example, node-A 110A may create multiple threads to process multiple allocation, requests concurrently, such as 40 requests concurrently in the distributed firewall application in FIG. 2.

In the example in FIG. 5, node-A 110A detects an exception (see 540) when it accesses shared pool 172 concurrently as node-B 110B. In this case, node-B 110B may have invoked the allocateFromPool( ) function just before node-A 110A, and successfully retrieved a batch of IDs (see 550) from shared pool 172. On the other hand, node-A 110A finds its invocation of the allocateFromPool( ) function unsuccessful in response to detecting the exception.

At 450 in FIG. 4, in response to determining that the retrieval is unsuccessful (i.e. exception detected), node-A 110A proceeds to perform a backoff process. For example, node-A 110A may invoke the function of thread.sleep(random_time) to set a random waiting time before reattempting the retrieval. The aim is to space out the retry and reduce the likelihood of another conflict or collision. Once the waiting time has elapsed, node-A 110A may proceed to 440 again to retrieve a new batch of IDs from shared pool 172. In practice, the number of retry attempts may be limited (e.g., defaultRetryAttempts=10) to prevent node 110A/110B/110C from retrying indefinitely. Further, retry by multiple threads executing on the same node may be synchronized, such as using Java synchronization. This reduces the number of retries to roughly the number of nodes in cluster 102.

At 455 and 460 in FIG. 4, in response to determining that the retrieval is successful (i.e., exception not detected), node-A 110A updates cache-A 122A with the new batch of IDs. For example in FIG. 5, a new batch of IDs (see 560) is allocated to node-A 110A, and cache-A 122A is updated with cache.remaining=batchSize (e.g., N=1024) and cache.next=batchStart (e.g., 5N+1=5097). Shared pool 172 is also updated with pool.lastAllocated=5N=5120 to indicate the last ID in the new batch allocated to node-A 110A.

Example process 400 then proceeds to 425, 430 and 435. In particular, in response to the request to allocate M=50 IDs to ID consumer 126A, K=50 IDs starting from cache.next=5097 to 5146 are allocated. Cache-A 122A is then updated with cache.remaining=cache.remaining−K=1024−50=974; and cache.next=cache.next+K=5097+50=5147. This completes the ID allocation process.

Although one shared pool 172 is shown in FIG. 5, it should be understood that node-A 110A, node-B 110B and node-C 110C from cluster 102 may share multiple pools for supporting different applications that require unique ID allocation. In this case, a retrieval request may specify a particular shared pool 172, such as in the form of allocateFromPool(poolID). Additionally, a particular batchSize may be specified in a retrieval request, such as allocateFromPool (poolID,batchSize).

In at least some embodiments of the present disclosure, ID allocation may be performed in a lightweight, unmanaged manner that does not necessitate lifecycle management of IDs. For example, ID leakage may occur during ID allocation. Here, the term "leakage" may refer generally to the loss of IDs before they are consumed or allocated. Conventionally, to prevent ID leakage, lifecycle management of IDs is performed to manage temporary allocation and subsequent release of IDs. However, this creates additional processing burden for node 110A/110B/110C and causes unnecessary delay to ID allocation.

To further improve the efficiency of ID allocation, ID leakage may be tolerated to avoid the need for lifecycle management. For example in FIG. 1, any unconsumed IDs in cache 122A/122B/122C may be lost once node 110A/110B/110C restarts or fails. Consider the case of node-A 110A with cache.remaining=974 and cache.next=5147. When node-A 110A restarts or fails, the remaining 974 IDs will be lost even though the IDs have not been allocated to any ID consumer. According to example process 400, instead of attempting to track the unconsumed IDs, node-A 110A simply has to retrieve a new batch of IDs from shared pool 172 the next time it receives a new ID allocation request. In practice, shared pool 172 may be sufficiently large (e.g., $2^{30}$) to meet the ID consumption requirement within cluster 102, and batchSize=N selected to reduce internal fragmentation due to ID leakage. When one shared pool 172 is exhausted, another pool may be created to service more ID allocations.

Using a lightweight approach, the processing burden associated with ID lifecycle management in conventional heavyweight may be avoided. This in turn facilitates ID allocation that is substantially in line with Application Programming Interface (API) speeds supported by node 110A/110B/110C. For example, if node-A 110A is configured to support 300 API requests per minute, ID allocation module 120A should support substantially 300 ID allocations per minute to avoid, or reduce the likelihood of, adversely affecting the performance of node-A 110A. The same approach may be applied to node-B 110B and node-C 110C.

ID allocation according to examples of the present disclosure is database-agnostic. In practice, any suitable data management technology may be used, such as a distributed data management platform in the form of Pivotal GemFire, etc. In one example, shared pool 172 may be implemented as a persistent entity that is common across cluster 102 and replicated on all nodes 110A-110C. In this case, replication regions may be configured to each store a copy of shared pool 172, such as a first replicated region for node-A 110A, a second replicated region for node-B 110B and a third replicated region for node-C 110C. The regions are analogous to tables in a relational database and manage data in a distributed fashion as name/value pairs. This reduces the latency of data access from shared pool 172 by each node 110A/110B/110C. Any changes made to shared pool 172 will be persisted across the different replicated regions.

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, when executed by the processor, cause the processor to perform processes described herein with reference to FIG. 1 to FIG. 5. For example, computing devices capable of acting as node 110A/110B/110C may be deployed in virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

Although examples of the present disclosure refer to "virtual machines," it should be understood that a virtual machine running within a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system such as Docker, etc.; or implemented as an operating system level virtualization), virtual private servers client computers, etc. The virtual machines may also be complete computation environments, containing virtual equivalents of the hardware and system software components of a physical computing system.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that, designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

What is claimed is:

1. A method for a first node to perform identifier (ID) allocation in a virtualized computing environment that includes a cluster formed by the first node and at least one second node, the method comprising:

accessing a storage that stores multiple pools of IDs associated with the cluster;

retrieving, from the storage, a batch of IDs to store in a cache at the first node locally, wherein the multiple pools of IDs in the storage are shared by the first node and the at least one second node in the cluster, wherein the batch of IDs is retrieved for subsequent ID allocation by the first node, and wherein the first node maintains multiple caches to store different batches of IDs that are respectively retrieved from the multiple pools of IDs; and in response to receiving a request for ID allocation from an ID consumer:

based on the request, allocating, from the batch of IDs in the cache, one or more IDs to respective one or more objects for unique identification of the one or more objects across the cluster; and sending, to the ID consumer, a response that includes the allocated one or more IDs, wherein sending the response includes:

in response to determining that a number of available IDs stored in the cache is insufficient to meet the request, sending the available IDs, which meet a portion of the request, to the ID consumer to enable the ID consumer to start using the available IDs, wherein the multiple pools of IDs correspond to respective different types of ID consumers, and wherein the allocating the one or more IDs comprises:

allocating the one or more IDs from the batch of IDs to the ID consumer which is a particular type of ID consumer, wherein IDs from other batches of IDs are allocated to other ID consumers which are other types of ID consumers respectively corresponding to the multiple pools of IDs, and wherein the different types of ID consumers use IDs for unique identification of: one or more firewall rules; one or more network address translation (NAT) rules; one or more logical routers; or one or more logical switches in the virtualized computing environment.

2. The method of claim 1, wherein the allocating the one or more IDs comprises:
in response to determining that the cache is empty, retrieving a new batch of IDs from the storage to store in the cache.

3. The method of claim 2, wherein the retrieving the new batch of IDs further comprises:
determining whether retrieval of the new batch of IDs from the storage is performed successfully; and
in response to determining that the retrieval is performed successfully, updating the cache with the new batch of IDs; but otherwise, in response to determining that the retrieval is performed unsuccessfully, performing a backoff process prior to reattempting the retrieval.

4. The method of claim 3, wherein the determining that the retrieval is performed unsuccessfully comprises:
detecting an exception indicating that a particular pool of IDs, amongst the multiple pools of IDs, having the new batch of IDs is concurrently accessed by multiple threads executing on the first node, or multiple threads executing on the first node and the at least one second node in the cluster.

5. The method of claim 3, wherein the determining that the retrieval is performed successfully comprises:
determining that an attribute associated with a particular pool of IDs, amongst the multiple pools of IDs, having the new batch of IDs is successfully updated to indicate a last value in the new batch of IDs retrieved from the particular pool of IDs.

6. The method of claim 5, further comprising:
in response to one or more unconsumed IDs of the batch of IDs being lost from the cache, retrieving, from the storage based on the updated attribute, another batch of IDs to store in the cache at the first node locally after receiving another request for ID allocation from the ID consumer.

7. The method of claim 1, wherein the sending the available IDs comprises:
allocating the one or more IDs based on a minimum quantity between a first quantity requested by the request and a second quantity available in the cache.

8. A non-transitory computer-readable storage medium that includes a set of instructions which, in response to execution by a processor of a first node, cause the processor to perform a method of identifier (ID) allocation in a virtualized computing environment that includes a cluster formed by the first node and at least one second node, the method comprising:
accessing a storage that stores multiple pools of IDs associated with the cluster;
retrieving, from the storage, a batch of IDs to store in a cache at the first node locally, wherein the multiple pools of IDs in the storage are shared by the first node and the at least one second node in the cluster, wherein the batch of IDs is retrieved for subsequent ID allocation by the first node, and wherein the first node maintains multiple caches to store different batches of IDs that are respectively retrieved from the multiple pools of IDs; and
in response to receiving a request for ID allocation from an ID consumer:
based on the request, allocating, from the batch of IDs in the cache, one or more IDs to respective one or more objects for unique identification of the one or more objects across the cluster; and
sending, to the ID consumer, a response that includes the allocated one or more IDs, wherein sending the response includes:
in response to determining that a number of available IDs in the cache is insufficient to meet the request, sending the available IDs, which meet a portion of the request, to the ID consumer to enable the ID consumer to start using the available IDs,
wherein the multiple pools of IDs correspond to respective different types of ID consumers, and wherein the allocating the one or more IDs comprises:
allocating the one or more IDs from the batch of IDs to the ID consumer which is a particular type of ID consumer, wherein IDs from other batches of IDs are allocated to other ID consumers which are other types of ID consumers respectively corresponding to the multiple pools of IDs, and wherein the different types of ID consumers use IDs for unique identification of: one or more firewall rules; one or more network address translation (NAT) rules; one or more logical routers; or one or more logical switches in the virtualized computing environment.

9. The non-transitory computer-readable storage medium of claim 8, wherein the allocating the one or more IDs comprises:
in response to determining that the cache is empty, retrieving a new batch of IDs from the storage to store in the cache.

10. The non-transitory computer-readable storage medium of claim 9, wherein the retrieving the new batch of IDs further comprises:
determining whether retrieval of the new batch of IDs from the storage is performed successfully; and
in response to determining that the retrieval is performed successfully, updating the cache with the new batch of IDs; but otherwise, in response to determining that the retrieval is performed unsuccessfully, performing a backoff process prior to reattempting the retrieval.

11. The non-transitory computer-readable storage medium of claim 10, wherein the determining that the retrieval is performed unsuccessfully comprises:
detecting an exception indicating that a particular pool of IDs, amongst the multiple pools of IDs, having the new batch of IDs is concurrently accessed by multiple threads executing on the first node, or multiple threads executing on the first node and at least one second node in the cluster.

12. The non-transitory computer-readable storage medium of claim 10, wherein the determining that the retrieval is performed successfully comprises:
determining that an attribute associated with a particular pool of Ds, amongst the multiple pools of IDs, having the new batch of IDs is successfully updated to indicate a last value in the new batch of IDs retrieved from the particular pool of IDs.

13. The non-transitory computer-readable storage medium of claim 8, wherein the sending the available IDs comprises:
allocating the one or more IDs based on a minimum quantity between a first quantity requested by the request and a second quantity available in the cache.

14. A first node configured to perform identifier (ID) allocation in a virtualized computing environment that includes a cluster formed by the first node and at least one second node, the first node comprising:

a processor;

multiple caches; and a non-transitory computer-readable medium having stored thereon instructions that, in response to execution by the processor, cause the processor to:

access a storage that stores multiple pools of IDs associated with the cluster;

retrieve, from the storage, a batch of IDs to store in a cache amongst the multiple caches, wherein the multiple pools of IDs in the storage are shared by the first node and the at least one second node in the cluster, wherein the batch of IDs is retrieved for subsequent ID allocation by the first node, and wherein the multiple caches store different batches of IDs that are respectively retrieved from the multiple pools of IDs; and in response to a request for ID allocation from an ID consumer:

based on the request, allocate, from the batch of IDs in the cache, one or more IDs to respective one or more objects for unique identification of the one or more objects across the cluster; and send, to the ID consumer, a response that includes the allocated one or more IDs, wherein the instructions that cause the processor to send the response include instructions that cause the processor to:

in response to determination that a number of available IDs in the cache is insufficient to meet the request, send the available IDs, which meet a portion of the request, to the ID consumer to enable the ID consumer to start using the available IDs, wherein the multiple pools of IDs correspond to respective different types of ID consumers, and wherein the instructions that cause the processor to allocate the one or more IDs include instructions that cause the processor to:

allocate the one or more IDs from the batch of IDs to the ID consumer which is a particular type of ID consumer, wherein IDs from other batches of IDs are allocated to other ID consumers which are other types of ID consumers respectively corresponding to the multiple pools of IDs, and wherein the different types of ID consumers use IDs for unique identification of: one or more firewall rules; one or more network address translation (NAT) rules; one or more logical routers; or one or more logical switches in the virtualized computing environment.

15. The first node of claim 14, wherein the instructions that cause the processor to allocate the one or more IDs include instructions that cause the processor to:

in response to determination that the cache is empty, retrieve a new batch of IDs from the storage to store in the cache.

16. The first node of claim 15, wherein the instructions that cause the processor to retrieve a new batch of IDs include instructions that further cause the processor to:

determine whether retrieval of the new batch of IDs from the storage is performed successfully; and in response to determination that the retrieval is performed successfully, update the cache with the new batch of IDs; but otherwise, in response to determination that the retrieval is performed unsuccessfully, perform a backoff process prior to reattempting the retrieval.

17. The first node of claim 16, wherein the instructions that cause the processor to determine that the retrieval is performed unsuccessfully include instructions that cause the processor to:

detect an exception indicating that a particular pool of IDs, amongst the multiple pools of IDs, having the new batch of IDs is concurrently accessed by multiple threads executing on the first node, or multiple threads executing on the first node and at least one second node in the cluster.

18. The first node of claim 16, wherein the instructions that cause the processor to determine that the retrieval is performed successfully include instructions that cause the processor to:

determine that an attribute associated with a particular pool of IDs, amongst the multiple pools of IDs, having the new batch of IDs is successfully updated to indicate a last value in the new batch of IDs retrieved from the particular pool of IDs.

19. The first node of claim 14, wherein the instructions that cause the processor to send the available IDs include instructions that cause the processor to:

allocate the one or more IDs based on a minimum quantity between a first quantity requested by the request and a second quantity available in the cache.

* * * * *